(12) United States Patent
Hanak (10) Patent No.: US 10,228,987 B2
(45) Date of Patent: Mar. 12, 2019

(54) METHOD TO ASSESS UNCERTAINTIES AND CORRELATIONS RESULTING FROM MULTI-STATION ANALYSIS OF SURVEY DATA

(71) Applicant: Francis Chad Hanak, League City, TX (US)

(72) Inventor: Francis Chad Hanak, League City, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 1287 days.

(21) Appl. No.: 13/780,054

(22) Filed: Feb. 28, 2013

(65) Prior Publication Data

US 2014/0244176 A1    Aug. 28, 2014

(51) Int. Cl.
| | | |
|---|---|---|
| *G06F 11/00* | (2006.01) | |
| *G01V 3/38* | (2006.01) | |
| *G05B 19/404* | (2006.01) | |
| *E21B 47/024* | (2006.01) | |
| *E21B 7/04* | (2006.01) | |

(52) U.S. Cl.
CPC ............... *G06F 11/00* (2013.01); *G01V 3/38* (2013.01); *G05B 19/404* (2013.01); *E21B 7/04* (2013.01); *E21B 47/024* (2013.01)

(58) Field of Classification Search
CPC .......... E21B 47/024; E21B 7/04; G06F 11/00; G05B 19/404; G01V 3/38
See application file for complete search history.

(56) References Cited

U.S. PATENT DOCUMENTS

| | | | |
|---|---|---|---|
| 4,454,756 A | | 6/1984 | Sharp et al. |
| 4,956,921 A | | 9/1990 | Coles |
| 5,103,920 A | * | 4/1992 | Patton ............ E21B 7/04 |
| | | | 175/45 |
| 5,155,916 A | | 10/1992 | Engebretson |
| 5,321,893 A | * | 6/1994 | Engebretson ...... E21B 47/022 |
| | | | 33/304 |
| 5,623,407 A | | 4/1997 | Brooks |
| 5,995,906 A | | 11/1999 | Doyen et al. |
| 6,088,294 A | | 7/2000 | Leggett, III et al. |
| 6,179,067 B1 | | 1/2001 | Brooks |

(Continued)

FOREIGN PATENT DOCUMENTS

WO    WO2011016928 A1    2/2011

OTHER PUBLICATIONS

Smith et al. "On the Representation and Estimation of Spatial Uncertainty," The International Jorunal od Robotics Research, vol. 5, No. 4, 1986, pp. 56-68.*

(Continued)

*Primary Examiner* — Janet L Suglo
*Assistant Examiner* — Liam R Casey
(74) *Attorney, Agent, or Firm* — Cantor Colburn LLP (57) ABSTRACT

A system, method and computer-readable medium for a drilling a borehole is disclosed. Errors associated with multi-station survey measurements are obtained and partitioned into a set of estimated errors and a set of considered errors. A post-fit covariance matrix is determined from the estimated errors and includes the effects of the considered errors on the estimated errors. A drilling parameter of a drill string in the borehole may be altered using the determined post-fit covariance matrix.

28 Claims, 3 Drawing Sheets

(56) References Cited

U.S. PATENT DOCUMENTS

| | | | |
|---|---|---|---|
| 6,389,289 B1 * | 5/2002 | Voce | H04B 7/18547 |
| | | | 455/429 |
| 6,736,221 B2 | 5/2004 | Chia et al. | |
| 7,823,661 B2 | 11/2010 | Mintcchev et al. | |
| 8,065,087 B2 | 11/2011 | Ekseth et al. | |
| 8,180,571 B2 | 5/2012 | Holmes | |
| 8,185,312 B2 | 5/2012 | Ekseth et al. | |
| 2002/0005298 A1 | 1/2002 | Estes et al. | |
| 2003/0046005 A1 | 3/2003 | Haarstad | |
| 2003/0101033 A1 * | 5/2003 | Torkildsen | G01V 11/00 |
| | | | 703/10 |
| 2003/0121657 A1 * | 7/2003 | Chia | E21B 47/022 |
| | | | 166/255.2 |
| 2003/0193837 A1 * | 10/2003 | Rommel | G01V 1/003 |
| | | | 367/37 |
| 2004/0149004 A1 | 8/2004 | Wu | |
| 2009/0120690 A1 * | 5/2009 | Phillips | E21B 44/00 |
| | | | 175/45 |
| 2010/0169018 A1 * | 7/2010 | Brooks | E21B 47/09 |
| | | | 702/9 |
| 2010/0211318 A1 | 8/2010 | Brooks | |
| 2012/0046863 A1 | 2/2012 | Hope et al. | |
| 2012/0123757 A1 | 5/2012 | Ertas et al. | |
| 2012/0221376 A1 | 8/2012 | Austin | |
| 2012/0232871 A1 * | 9/2012 | Priezzhev | G01V 7/00 |
| | | | 703/10 |
| 2012/0257475 A1 | 10/2012 | Luscombe et al. | |

OTHER PUBLICATIONS

PCT International Search Report and Written Opinion; International Application No. PCT/US2014/018644; International Filing Date: Feb. 26, 2014; dated Jun. 24, 2014; pp. 1-15.

Kalman, R. E.; "A New Approach to Linear Filtering and Prediction Problems," Transactions of the ASME—Journal of Basic Engineering, 82 (Series D): 1960, pp. 35-45.

* cited by examiner

METHOD TO ASSESS UNCERTAINTIES AND CORRELATIONS RESULTING FROM MULTI-STATION ANALYSIS OF SURVEY DATA

BACKGROUND OF THE DISCLOSURE

1. Field of the Disclosure

The present disclosure relates to directional drilling and, in particular, to a method of determining an expected distribution of errors in downhole survey parameter measurements used in directional drilling.

2. Description of the Related Art

One aspect of direction drilling of a borehole in a formation includes determining a current position and/or orientation of a drill bit or other suitable unit of a drill string. Various survey instruments are often used to determine the current position and orientation. These survey instruments include a magnetometer for taking magnetic measurements in three orthogonal directions, an accelerometer for taking gravity measurements in three orthogonal directions and various tools for measuring toolface azimuth and inclination of the drill string. Various errors may arise during any of these measurements. The error that arises in survey measurements is assumed to conform to a pre-specified error model which may be used to predict borehole position uncertainty as a function of the survey errors. However, various factors, such as excessive magnetic interference from a bottomhole assembly of the drill string, magnetic effects of magnetic drilling mud, poor calibration of survey instruments, etc., may introduce errors that lie outside of the specifications of the error model.

Multi-station analysis is generally applied to a set of surveys as a method of quality control by estimating corrections to various error parameters such as magnetometer bias, scale factors, reference dip angle, etc. that may cause error in survey parameters. These estimated corrections may then be used to correct the survey parameters to conform to the error model. One problem of multi-station analysis is that while error models assume independent (uncorrelated) terms, in actuality various error parameters, for example z-axis bias and z-axis scale factor, become correlated and therefore generally may not be completely separable. The present disclosure provides a method of determining error terms that includes calculating the correlations between error terms.

SUMMARY OF THE DISCLOSURE

In one aspect, the present disclosure provides a method of a drilling a borehole, the method including: obtaining errors associated with multi-station survey measurements; partitioning the obtained errors into a set of estimated errors and a set of considered errors; determining a post-fit covariance matrix for the estimated errors that includes the effects of the considered errors on the estimated errors; and altering a drilling parameter of a drill string in the borehole using the post-fit covariance matrix.

In another aspect the present disclosure provides a system for drilling a borehole, the system including a drill string configured to drill the borehole; and a processor configured to: obtain errors associated with previous downhole survey measurements, partition the obtained errors into a set of estimated errors and a set of considered errors, determine a post-fit covariance matrix for the estimated errors that includes the effects of the considered errors on the estimated errors; and alter a drilling parameter of the drill string using the post-fit covariance matrix.

In another aspect, the present disclosure provides a computer-readable medium having a set of instructions stored thereon and accessible to a processor to perform a method of a drilling a borehole, the method including: obtaining errors associated with multi-station survey measurements; partitioning the obtained errors into a set of estimated errors and a set of considered errors; determining a post-fit covariance matrix for the estimated errors that includes the effects of the considered errors on the estimated errors; and altering a drilling parameter of a drill tool in the borehole using the post-fit covariance matrix.

Examples of certain features of the apparatus and method disclosed herein are summarized rather broadly in order that the detailed description thereof that follows may be better understood. There are, of course, additional features of the apparatus and method disclosed hereinafter that will form the subject of the claims.

BRIEF DESCRIPTION OF THE DRAWINGS

For detailed understanding of the present disclosure, references should be made to the following detailed description of the exemplary embodiment, taken in conjunction with the accompanying drawings, in which like elements have been given like numerals and wherein.

DETAILED DESCRIPTION OF THE DISCLOSURE

Figure 1:
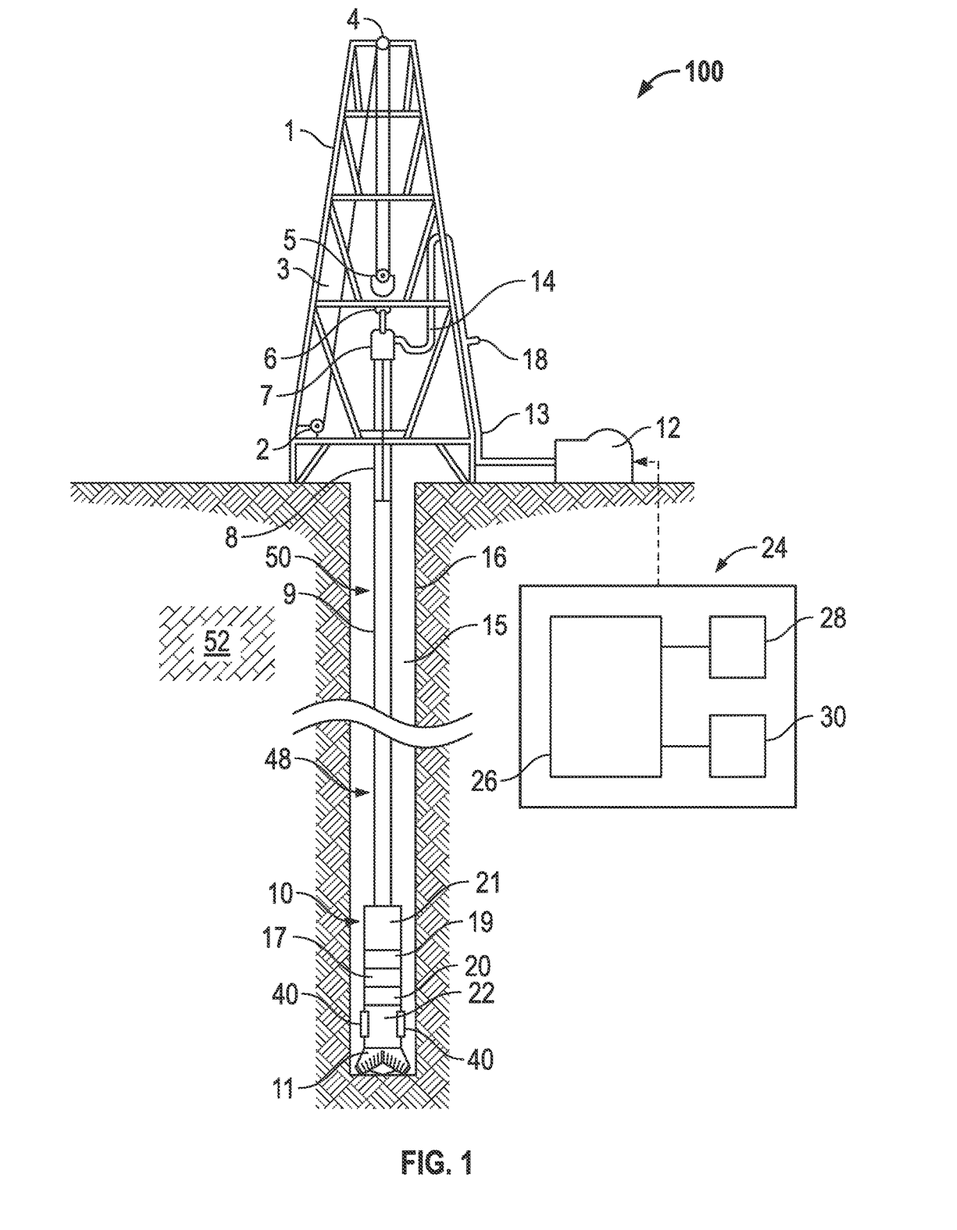
FIG. 1 illustrates an exemplary drilling system that includes a drilling rig engaged in drilling operations.

FIG. 1 illustrates an exemplary drilling system 100 that includes a drilling rig engaged in drilling operations. The exemplary drilling rig includes a derrick 1, drawworks 2, cable 3, crown block 4, traveling block 5, and hook 6 supporting a drillstring 50 disposed in a borehole penetrating formation 52. The drill string 50 includes a swivel joint 7, kelly 8, drillpipe 9, drill collars 10, and drill bit 11. Pumps 12 circulate drilling fluid through a standpipe 13 and flexible hose 14, down through the hollow drillstring 50 and back to the surface through the annular space 15 between the drillstring 50 and the borehole wall 16. A steering device 40 is disposed on the downhole portion of the drill string 50 in order to provide a physical mechanism by which an orientation or direction of the drill bit 11 may be altered to deviate from its current drilling direction towards another drilling direction. This steering device 40 may therefore be used to produce deviated sections or curved sections of the borehole 48.

During the course of drilling the borehole 48, it is advantageous to measure from time to time the orientation of the borehole 48 in order to determine its trajectory. This may be accomplished by the use of a survey tool 17 located within the drill collars 10 of the drill string 50. The survey tool 17 obtains survey measurements such as the direction and magnitude of the local gravitational and magnetic fields with respect to a tool-fixed coordinate system. The survey measurements may be used to determine inclination and azimuth of the borehole 48. It is customary to take a survey each time the drilling operation is interrupted to add a new section to the drillstring 50, which is typically about 30 meters or 100 feet. However, survey measurements may be taken at any time.

The survey measurements may be transmitted to the surface by a suitable telemetry system, such as such as electromagnetic telemetry methods or acoustic signal telemetry, or by using a modulating valve (not shown) placed in the flow passage within or adjacent to survey tool 17 that causes pressure pulses to propagate in the mud column up the drillstring. Such pressure pulses may be detected by a pressure transducer 18 placed in the standpipe 13 and communicated to control unit 24 which may be located on the rig floor or in a logging trailer or other work area. Alternately, the control unit 24 may be disposed at a downhole location along the drill string, and the survey measurements may be transmitted to the downhole control unit.

The exemplary control unit 24 may include a processor 26, a memory location 28 containing data related to survey measurements, such as magnetometer measurements, magnetometer biases, accelerometer measurements, accelerometer biases, and other errors, and a set of programs 30. The processor 26 may access the programs 30 to perform the exemplary methods disclosed herein for altering a drilling parameter using, in part, the measurements stored in memory location 30. The measurements stored in the memory 30 may include data obtained at a plurality of boreholes proximate the current borehole 48. The survey measurements may further include data related to errors or uncertainties in the obtained survey measurements as well as errors related to survey parameter obtained in nearby boreholes. Such errors may include errors due to magnetometer biases, gravimeter biases, errors in magnetic field measurements and dip measurements.

The borehole inclination may be determined by use of the gravitational measurements alone, while the borehole azimuth may be determined from the gravitational and magnetic measurements. Since the azimuth uses the direction of the local magnetic field as a north reference, the survey tool 17 may be placed in non-magnetic portions 19 and 20 of the drillstring situated between upper and lower ferromagnetic sections 21 and 22. Magnetization of the upper and lower ferromagnetic sections 21 and 22, as well as imperfections in the non-magnetic materials comprising the survey tool 17 and the non-magnetic collars 19 and 20 may produce a magnetic error field, which is fixed in the tool's frame of reference and which therefore appears as bias errors affecting the magnetic measurements.

Magnetometer measurements are used to obtain survey measurements. The magnetometer measurement may include a bias in any particular direction. Additionally, movement or rotation of the drill string with respect to the borehole and the movement of magnetic muds relative to the drill string will induce a magnetic bias in the survey measurements. Magnetic drillstring components may exhibit both remanent and induced magnetization. The error field due to induced magnetization may appear similar to a magnetometer scale factor error. The apparent scale factor errors may differ among the three axes of the magnetometer.

In one aspect, the present disclosure provides a method of determining a distribution in errors of survey measurements using survey measurements obtained at multiple stations using a multi-station analysis. Additionally, the present disclosure provides for using the determined error in the survey measurements to steer the drill string 50 or otherwise alter a drilling parameter of the drill string 50. In an additional aspect, the error terms obtained using the methods disclosed herein may be compared to a standard error model to improve a quality of the standard error model. In one embodiment, a state vector may be defined, wherein the elements of the state vector include the various errors of the various survey measurements. An exemplary state vector is presented in Eq. (1):

$$x = \begin{bmatrix} b_x \\ b_y \\ b_z \\ sf_x \\ sf_y \\ sf_z \\ B_{ref} \\ Dip \end{bmatrix} \quad \text{Eq. (1)}$$

where $b_x$, $b_y$, and $b_z$ are bias errors in the x, y and z direction, respectively, $sf_x$, $sf_y$, and $sf_z$ are scale factor errors in the x, y, and z direction, respectively, $B_{ref}$ is a measured reference magnetic field and Dip is the measured dip angle. The state vector x may include various errors that are common to survey measurements obtained from nearby wellbore stations. The exemplary state vector may be partitioned into a set of estimated errors $x_x$ and a set of considered errors $x_c$. In an exemplary embodiment, the set of estimated errors $x_x$ may include the magnetometer biases:

$$x_x = \begin{bmatrix} b_x \\ b_y \\ b_z \end{bmatrix} \quad \text{Eq. (2)}$$

while the set of considered errors $x_c$ may include scale factors, reference magnetic field and dip measurements:

$$x_c = \begin{bmatrix} sf_x \\ sf_y \\ sf_z \\ B_{ref} \\ Dip \end{bmatrix} \quad \text{Eq. (3)}$$

In various embodiments, the errors may be partitioned into their respective sets (i.e., estimate, considered) according to the desires of a particular user. The method disclosed herein performs an analysis that obtains a probabilistic distribution of the estimated errors and their effect on survey measurements in the current borehole 48 and hence on the estimated of position and orientation of the drill string 50. In various embodiments, the set of estimated errors in Eq. (2) are used to determine a post-fit covariance matrix that determines a post-fit distribution of the estimated errors. Entries in the post-fit covariance matrix may include post-fit estimated errors that include the effects of the considered errors of Eq. (3) on the estimated errors of Eq. (2). The post-fit covariance matrix may be used to determining the error terms with respect to various survey parameters, and thus may be used to alter a drilling parameter. More specifically, entries in the post-fit covariance matrix may provide a probability distribution of a selected error term that may be applied to position, orientation, etc. In one embodiment, the error terms may be displayed as an ellipsoid of uncertainty with respect to drill string position, orientation, etc., and the ellipsoid may be used in altering the drilling parameter.

Using the methods disclosed herein, the set of considered errors contribute to the determination of the post-fit covariance matrix but are not used directly in the determination. Thus, the post-fit covariance matrix may be determined even when the considered errors are non-observable. The considered errors may be non-observable, for example, when one can not numerically solve for the considered errors because the effect of the considered errors on the survey measurements are inseparable from the effects of other parameters on the survey measurements.

To calculate the post-fit covariance matrix, the state vector Eq. (1) may be rewritten as shown in Eq. (4):

$$x = \begin{bmatrix} x_x \\ x_c \end{bmatrix} \quad \text{Eq. (4)}$$

A corrupted measurement, g(x), may be expressed as a nonlinear function of the state variables according to $g(x)=h(x)+\epsilon$. This nonlinear measurement equation may be linearized about an initial estimate of the state (denoted $x^*$) and written as:

$$y = g(x) - h(x^*) = H_x \delta x + \epsilon \quad \text{Eq. (5)}$$

where H is a partial derivative matrix and $\epsilon$ is additive, zero-mean noise. The partial derivative matrix includes the partial derivative of the uncorrupted measurement with respect to the various error terms:

$$H = \frac{\partial h(x)}{\partial x}\bigg|_{x=x^*}. \quad \text{Eq. (6)}$$

The partial derivative matrix H may be partitioned similar to Eqs. (2) and (3), as shown in Eq. (7):

$$H = [H_x H_c] \quad \text{Eq. (7)}$$

The overall linearized measurement, which is a function of the state vector x, may therefore be given as:

$$y = H_x x_x + H_c x_c + \epsilon. \quad \text{Eq. (8)}$$

It is known (see Appendix) that an upper diagonal matrix U may be derived from the partial derivative matrix H in post-fit calculations and vector b may be derived from y in post-fit calculations. U and b may be partitioned as shown below in Eqs. (9).

$$U = \begin{bmatrix} U_{xx} & U_{xc} \\ 0 & U_{cc} \end{bmatrix} \quad \text{Eq. (9)}$$

$$b = \begin{bmatrix} b_x \\ b_c \end{bmatrix}$$

where $U_{xx}$ and $U_{cc}$ are upper triangular, and the size of each sub-matrix/vector is apparent from the context. Expanding the upper partition of Eq. (47) (see Appendix) using Eqs. (9) yields:

$$U_{xx}\hat{x}_x + U_{xy}\hat{x}_c = b_x \quad \text{Eq. (10)}$$

Solving Eq. (10) for $\hat{x}_x$ gives:

$$\hat{x}_x = U_{xx}^{-1}b_x - U_{xx}^{-1}U_{xy}\hat{x}_c \quad \text{Eq. (11)}$$

where $\hat{x}_c = U_{cc}^{-1}b_c$. Since the considered states $x_c$ are not to be estimated in the present method, the orthogonal matrix Q is selected to only upper-triangularize the first $n_x$ columns of the H matrix, where $n_x$ is the number of estimated states. Therefore:

$$QR^{-\frac{1}{2}}H = \begin{bmatrix} U_{xx} & U_{xc} \\ 0 & M \end{bmatrix} \quad \text{Eq. (12)}$$

where M is a partially transformed $(m-n_x) \times n_c$ matrix computed for the sole purpose of calculating $U_{xy}$. Furthermore, $$QR^{-\frac{1}{2}}y = \begin{bmatrix} b_x \\ e \end{bmatrix} \quad \text{Eq. (13)}$$

Since the measurements have not been used to update the estimate of $x_c$, $x_c$ is still characterized by its a priori estimate $\bar{x}_c$ and covariance ($P_{cc}$). Therefore, Eq. (10) may be rewritten as:

$$\hat{x}_x = U_{xx}^{-1}b_x - S\bar{x}_c \quad \text{Eq. (14)}$$

where $S \equiv -U_{xx}^{-1}U_{xy}$ is a sensitivity matrix that gives an influence of the considered errors on the estimated errors. Usually, $\bar{x}_c = 0$. The post-fit estimate of the state vector may be written as:

$$\begin{bmatrix} \hat{x}_x \\ \bar{x}_c \end{bmatrix} = \begin{bmatrix} U_{xx}^{-1}\left(\Gamma_x QR^{-\frac{1}{2}}y\right) + S\bar{x}_c \\ \bar{x}_c \end{bmatrix} \quad (15)$$

$$= \begin{bmatrix} U_{xx}^{-1}\Gamma_x QR^{-\frac{1}{2}}(H\Gamma_x^T x_x + H\Gamma_y^T x_c + \epsilon) + S\bar{x}_c \\ \bar{x}_c \end{bmatrix}$$

$$= \begin{bmatrix} x_x + U_{xx}^{-1}U_{xy}x_c + U_{xx}^{-1}\Gamma_x QR^{-\frac{1}{2}}\epsilon + S\bar{x}_c \\ \bar{x}_c \end{bmatrix}$$

$$= \begin{bmatrix} x_x - Sx_c + U_{xx}^{-1}\Gamma_x QR^{-\frac{1}{2}}\epsilon \\ \bar{x}_c \end{bmatrix}$$

where $$\Gamma_x = [\, I_{n_x \times n_x} \quad 0_{n_x \times (m-n_x)} \,] \quad (16)$$
$$\Gamma_y = [\, 0_{n_c \times n_x} \quad I_{n_c \times n_x} \quad 0_{n_c \times (m-n)} \,]$$

Thus, the post-fit state error vector can be formulated as follows:

$$\tilde{x} = \begin{bmatrix} \hat{x}_x - x_x \\ \bar{x}_c - x_c \end{bmatrix} \quad \text{Eq. (17)}$$

$$= \begin{bmatrix} -S\bar{x}_c + U_{xx}^{-1}\Gamma_x QR^{-\frac{1}{2}}\epsilon \\ x_c \end{bmatrix}$$

from which the post-fit error covariance matrix may be calculated in Eq. (18):

$$P = E[\tilde{x}\tilde{x}^T] \quad \text{Eq. (18)}$$

-continued $$= \begin{bmatrix} U_{xx}^{-1}U_{xx}^{-T} + S\bar{P}_{cc}S^T & -S\bar{P}_{cc} \\ -\bar{P}_{cc}S^T & \bar{P}_{cc} \end{bmatrix}$$

where the sub-matrices of Eq. (18) are calculated according to the following equations:

$$E[\tilde{x}_x \tilde{x}_x^T] = E\left[\left(-S\tilde{x}_c + U_{xx}^{-1}\Gamma_x QR^{-\frac{1}{2}}\epsilon\right)\left(-S\tilde{x}_c + U_{xx}^{-1}\Gamma_x QR^{-\frac{1}{2}}\epsilon\right)^T\right] \quad \text{Eq. (19)}$$

$$= U_{xx}^{-1}U_{xx}^{-T} + S\bar{P}_{cc}S^T$$

$$E[\tilde{x}_x \tilde{x}_c^T] = E\left[\left(-S\tilde{x}_c + U_{xx}^{-1}\Gamma_x QR^{-\frac{1}{2}}\epsilon\right)\tilde{x}_c^T\right]$$

$$= -S\bar{P}_{cc}$$

$$E[\tilde{x}_c \tilde{x}_x^T] = (E[\tilde{x}_x \tilde{x}_c^T])^T$$

$$= -\bar{P}_{cc}S^T$$

$$E[\tilde{x}_c \tilde{x}_c^T] = \bar{P}_{cc}$$

Thus, the entries of the post-fit covariance matrix provide error distributions that may be used to map an ellipsoid of uncertainty to various measurements, such as drill bit position, orientation, etc. The position uncertainties may then be considered when determining a change in a drilling parameter. Exemplary uncertainty ellipsoids are shown in FIGS. 2-4.

Figure 2:
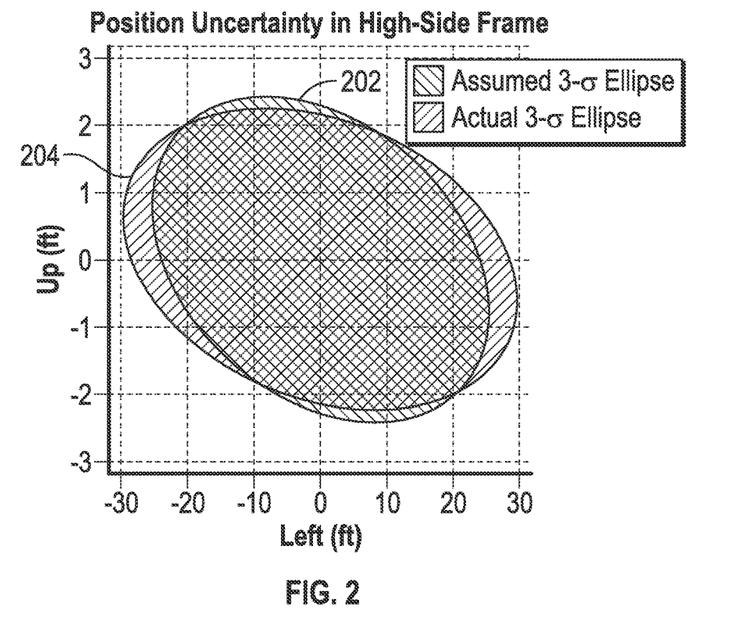
FIG. 2 shows predicted end-of run position uncertainty ellipsoids as viewed in an x-y plane of a high-side wellbore frame.

FIG. 2 shows predicted end-of run position uncertainty ellipsoids as viewed in an x-y plane of a high-side wellbore frame. Uncertainty along the left/right direction is shown in feet along the x-axis. Uncertainty along a vertical direction as determined by a high side of the drill string is shown in feet along the y-axis. Two 3-sigma probability ellipsoids are shown. The first ellipsoid 202 is a position uncertainty predicted at a final survey location based on a standard error model. The second ellipsoid 204 shows a position uncertainty obtained based on Eq. (18) of the present disclosure, where the estimate errors include the three components of magnetometer bias and three components of scale factor. As shown in FIG. 2, the magnitude of the left/right position uncertainty of the first ellipsoid 202 is understated by 14% in comparison to the left-right position uncertainty of the second ellipsoid 204.

Figure 3:
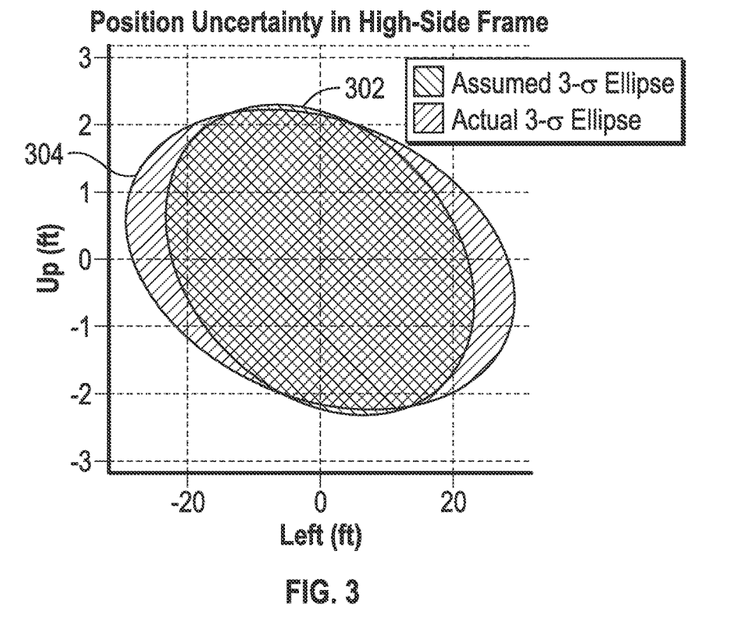
FIG. 3 shows a comparison of uncertainty ellipsoids in which the uncertainties in the standard error model have been tightened.

FIG. 3 shows a comparison of uncertainty ellipsoids in which the uncertainties in the standard error model have been tightened, for example, by cutting in half the magnetometer bias and scale factor uncertainties, as may be used in current industry practices. Uncertainty along the left/right direction is shown in feet along the x-axis. Uncertainty along a vertical direction as determined by a high side of the drill string is shown in feet along the y-axis. First ellipsoid 302 is the position uncertainty predicted at a final survey location based on a "tightened' standard error model. Second ellipsoid 304 shows a position uncertainty based on Eq. (18) of the present disclosure, where the estimate errors include the three components of magnetometer bias and three components of scale factor. Where the uncertainties have been tightened, the magnitude of the left/right position uncertainty of the first ellipsoid 302 is nonetheless understated by 28% in comparison to the left-right position uncertainty of the second ellipsoid 304.

Figure 4:
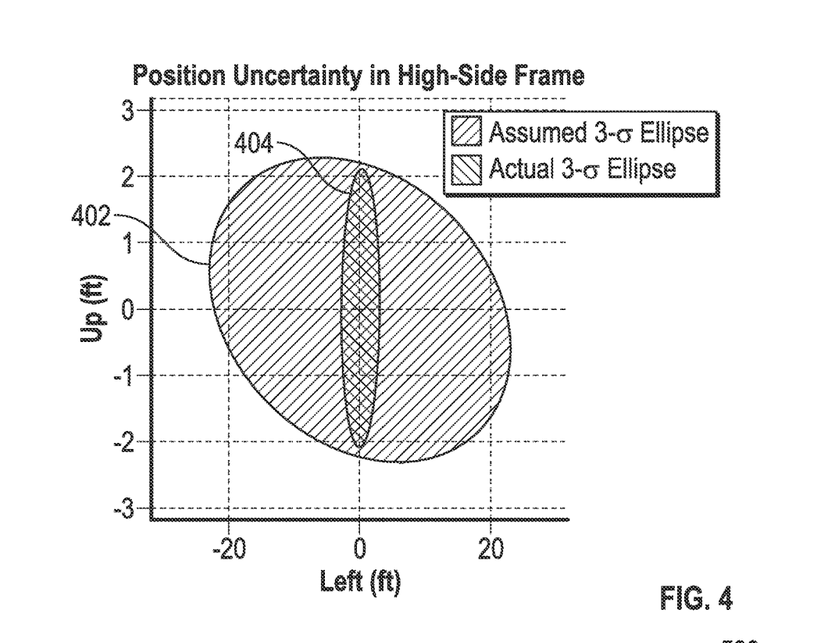
FIG. 4 shows a set of uncertainty ellipsoids wherein the uncertainty ellipsoid associated with the post-fit covariance matrix uses an expanded set of estimated errors.

FIG. 4 shows a set of uncertainty ellipsoids wherein the uncertainty ellipsoid associated with the post-fit covariance matrix uses an expanded set of estimated errors. Uncertainty along the left/right direction is shown in feet along the x-axis. Uncertainty along a vertical direction as determined by a high side of the drill string is shown in feet along the y-axis. First ellipsoid 402 is the position uncertainty predicted at a final survey location based on a standard error model. Second ellipsoid 404 shows a position uncertainty based on Eq. (18) of the present disclosure, where the estimated errors include the three components of magnetometer bias, three components of scale factor and the dip angle offset. Ellipsoid 404 shows a significant improvement in error terms uncertainty along the left-right direction over the ellipsoid 402 of the standard error model.

Figure 5:
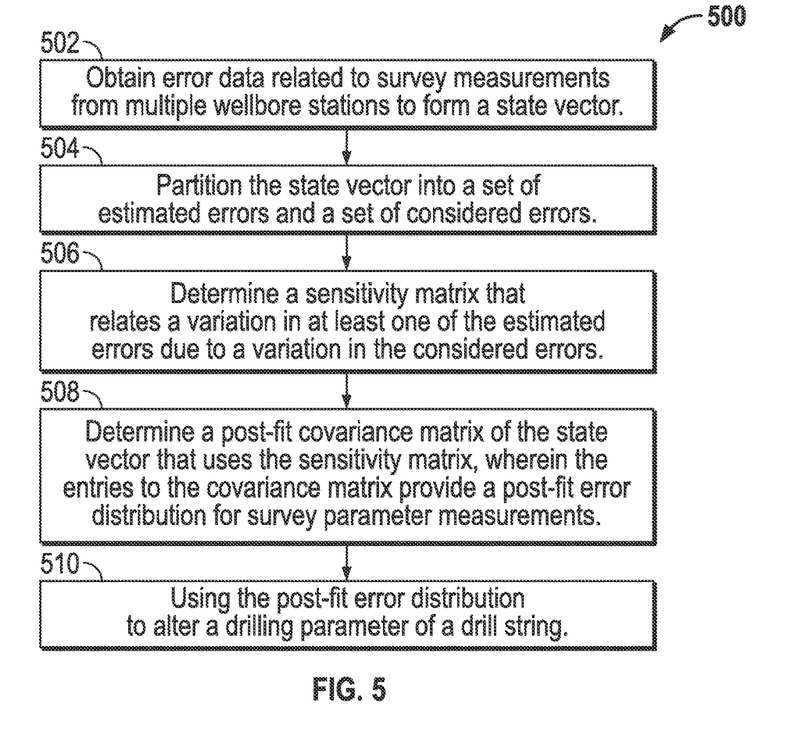
FIG. 5 shows a flowchart of an exemplary method for drilling a borehole using the methods disclosed herein.

FIG. 5 shows a flowchart of an exemplary method for drilling a borehole using the methods disclosed herein. In block 502, error data is obtained related to survey measurements from multiple wellbore stations in order to form a state vector of the error data. In block 504, the state vector is partitioned into a set of estimated errors and a set of considered errors. In block 506, a sensitivity matrix is determined that relates a variation in at least one of the estimated errors to a variation in the considered errors. In block 508, a post-fit covariance matrix is obtained using the sensitivity matrix, wherein the entries to the post-fit covariance matrix provide a final error distribution for survey measurements. In block 510, the post-fit covariance matrix is used to alter a drilling parameter of a drill string.

In another aspect, the present disclosure provides a method of determining whether or not it is justifiable to assign a new "tighter" error model (henceforth called the target error model). If the corrected data obtained via the methods disclosed in Equations (1)-(19) yields a wellbore position result at least as accurate as the target error model in question, then it is justified to assign the target error model to the data.

The a priori uncertainties of the target error model yield a three-dimensional position covariance matrix $P_t$ at a given survey location. The equivalent post-fit covariance matrix computed using the methods disclosed in Eqs. (1)-(19) are denoted by the three-dimensional position covariance matrix P. In mathematical terms, for a constant probability level, l, an ellipsoid describing $P_t$ may be defined by the equation $$x^T P_t^{-1} x = l^2 \quad \text{Eq. (20)}$$

where $$x = \begin{bmatrix} x \\ y \\ z \end{bmatrix} \quad \text{Eq. (21)}$$

and the variables in x are jointly Gaussian and zero-mean. This follows from the probability density function of the multivariate normal distribution of a zero-mean vector, x, $$f_X(x) = \frac{1}{(2\pi)^{3/2}|P_t|^{1/2}} e^{-\frac{1}{2}x^T P_t^{-1} x} \quad \text{Eq. (22)}$$

where $|P_t|$ is the determinant of $P_t$. The ellipsoid describing the equivalent constant probability level for the covariance matrix P is similarly given by $$x^T P^{-1} x = l^2 \quad \text{Eq. (23)}$$

The question of whether the ellipsoid describing $P_t$ bounds the ellipsoid describing P may be answered by examining two questions. First, is P smaller than $P_t$ in a particular direction? Any direction will suffice, so in an exemplary embodiment, the check may be on a selected condition, i.e., is $\sqrt{\vec{p}_{t11}} > \sqrt{\vec{p}_{11}}$? Secondly, do the ellipsoids describe by Eqs. (20) and (23) intersect? If the ellipsoid corresponding to $P_t$ is of greater extent than that of P at one location, and the two ellipsoids do not intersect, then the $P_t$ must bound the P everywhere.

Checking for intersection may be simplified using a theory of two-dimensional conic sections. If the two ellipsoids of Eqs. (20) and (23) intersect for a given value of x, then the following condition must hold:

$$x^T P_t^{-1} x = x^T P^{-1} x \qquad \text{Eq. (24)}$$

Using the notation $Q = P_t^{-1} - P^{-1}$, Eq. (24) may be rewritten as:

$$x^T Q x = 0 \qquad \text{Eq. (25)}$$

Eq. (25) is a single equation in three unknowns. Expanding Eq. (25) and using $Q = \{q_{ij}\}$ results in the following Eq. (26):

$$q_{11} x^2 + q_{22} y^2 + q_{22} z^2 + 2 q_{21} xy + 2 q_{31} xz + 2 q_{32} yz = 0 \qquad \text{Eq. (26)}$$

because Q is symmetric. Grouping powers of x gives:

$$q_{11} x^2 + (2 q_{21} y + 2 q_{31} z) x + (q_{22} y^2 + q_{33} z^2 + 2 q_{32} yz) = 0 \qquad \text{Eq. (27)}$$

which can be solved for x according to the quadratic formula:

$$x = \frac{-(2 q_{21} y + 2 q_{31} z) \pm \sqrt{(2 q_{21} y + 2 q_{31} z)^2 - 4 q_{11} (q_{22} y^2 + q_{33} z^2 + 2 q_{32} yz)}}{2 q_{11}} \qquad \text{Eq. (28)}$$

A real solution for x exists only if the determinant is greater than or equal to 0:

$$(2 q_{21} y + 2 q_{31} z)^2 - 4 q_{11} (q_{22} y^2 + q_{33} z^2 + 2 q_{32} yz) \geq 0 \qquad \text{Eq. (29)}$$

If Eq. (29) is not satisfied, then the lack of a real solution for x indicates that the two probability ellipsoids do not intersect. Thus, our second condition comes down to checking if any combination of y and z satisfies Eq. (29). Eq. (29) may be written in a standard form of a conic section centered at the origin:

$$ay^2 + hyz + bz^2 = -c \qquad \text{Eq. (30)}$$

where $$a = q_{21}^2 - q_{11} q_{22}$$

$$h = 2 q_{21} q_{31} - 2 q_{11} q_{32}$$

$$b = q_{31}^2 - q_{11} q_{33} \qquad \text{Eq. (31)}$$

and c is any value that is less than zero.

The yz term in Eq. (30) may be eliminated by a coordinate transformation through an angle $\theta$, using $$\begin{bmatrix} y \\ z \end{bmatrix} = \begin{bmatrix} \cos\theta & -\sin\theta \\ \sin\theta & \cos\theta \end{bmatrix} \begin{bmatrix} y' \\ z' \end{bmatrix} \qquad \text{Eq. (32)}$$

Substituting y and z from Eq. (32) into Eq. (30) yields:

$$a(y' \cos\theta - z' \sin\theta)^2 + 2h(y' \cos\theta - z' \sin\theta)(y' \sin\theta + z' \cos\theta) + b(y' \sin\theta + z' \cos\theta)^2 = -c \qquad \text{Eq. (33)}$$

The coefficient of the y 'z' term in Eq. (33) is zero when $$2(b-a)\sin\theta \cos\theta + 2h(\cos^2\theta - \sin^2\theta) = 0 \qquad \text{Eq. (34)}$$

which results in the condition $$\tan 2\theta = \frac{2h}{a-b}. \qquad \text{Eq. (35)}$$

(The ambiguity in $\theta$ is inconsequential when only checking for existence of a solution.) After the coordinate transformation, Eq. (33) may be re-written in the form $$Ay'^2 + Bz'^2 = K \qquad \text{Eq. (36)}$$

where $$A = a \cos^2\theta + 2h \cos\theta \sin\theta + b \sin^2\theta$$

$$B = a \sin^2\theta - 2h \cos\theta \sin\theta + b \cos^2\theta$$

$$K = -c \qquad \text{Eq. (37)}$$

With the substitution $K=-c$, it is possible to determine when a solution of Eq. (36) exists for $K \geq 0$. If no solution exists, then the probability ellipsoids do not intersect.

There are two scenarios to consider. In the first scenario, $K=0$. In this case, x from Eq. (28) reduces to a line or plane describing the locus of intersection points as the probability parameter 1 varies. As a result, $K=0$ occurs when $A=B=0$ or when A and B have opposite signs. In the second scenario, $K>0$, which also indicates that a real solution to Eq. (28) exists. This condition may occur when A and B have opposite sings or when both A and B are positive. Thus, the only condition which ensures that $K<0$, and thus no solution to Eq. (28) exists, is when both A and B are strictly less than 0.

To summarize, the covariance matrix $P_t$ can be said to bound to covariance matrix P for a given probability level if the following conditions hold:

$$\sqrt{p_{t11}} > \sqrt{p_{11}}$$

$$A < 0$$

$$B < 0 \qquad \text{Eq. (38)}$$

where A and B are defined in Equation 18. Such a result would justify the assignment of the target error model to the MSA-corrected data set.

Thus, in one aspect, the present disclosure provides a method of a drilling a borehole, the method including: obtaining errors associated with multi-station survey measurements; partitioning the obtained errors into a set of estimated errors and a set of considered errors; determining a post-fit covariance matrix for the estimated errors that includes the effects of the considered errors on the estimated errors; and altering a drilling parameter of a drill string in the borehole using the post-fit covariance matrix. The method may further include determining a sensitivity matrix relating a variation in the set of estimated errors to a variation in the set of considered errors, and using the sensitivity matrix to determine the post-fit covariance matrix. A distribution of the estimated errors in survey measurements of the borehole may be determined from the post-fit covariance matrix, and the drilling parameter may then be altered using the distribution of the estimated errors. In one embodiment, the post-fit covariance matrix may be determined when the considered errors are non-observable. In various embodiments, the obtained errors include at least one selected from the group consisting of: magnetometer bias, accelerometer bias, scale factor, total field measurements and dip. A first uncertainty ellipsoid with respect to a position of a drill string may be determined from the post-fit covariance matrix, and subsequently used in altering the drilling parameter. In one embodiment, it is determined whether the first uncertainty ellipsoid is bounded by a second uncertainty ellipsoid. It may be determined that the first uncertainty ellipsoid is bounded by the second uncertainty ellipsoid when the post-fit covariance matrix associated with the first uncertainty ellipsoid is less than a target covariance matrix associated with the second uncertainty ellipsoid in a particular direction, and when the first uncertainty ellipsoid and the second uncertainty ellipsoid do not intersect. When the first uncertainty ellipsoid is determined to be bounded by the second uncertainty ellipsoid, the method may select the second uncertainty ellipsoid for altering the drilling parameter.

In another aspect the present disclosure provides a system for drilling a borehole, the system including a drill string configured to drill the borehole; and a processor configured to: obtain errors associated with previous downhole survey measurements, partition the obtained errors into a set of estimated errors and a set of considered errors, determine a post-fit covariance matrix for the estimated errors that includes the effects of the considered errors on the estimated errors; and alter a drilling parameter of the drill string using the post-fit covariance matrix. The processor may be further configured to determine a sensitivity matrix relating a variation in the set of estimated errors to a variation in the set of considered errors, and use the sensitivity matrix to determine the post-fit covariance matrix. The processor may be further configured to determine a distribution of the estimated errors in the survey measurements of the borehole from the post-fit covariance matrix; and alter the drilling parameter using the distribution of the estimated errors. In one embodiment, the post-fit covariance matrix may be determined when the considered errors are non-observable. In various embodiments, the obtained errors include at least one selected from the group consisting of: magnetometer bias, accelerometer bias, scale factor, total field measurements and dip. The post-fit covariance matrix may provide a distribution of the estimated errors in the downhole survey measurements. The processor may be further configured to determine a first uncertainty ellipsoid with respect to a position of a drill string from the determined post-fit covariance matrix; and use the first uncertainty ellipsoid to alter the drilling parameter. Additionally, the processor may determine whether the first uncertainty ellipsoid is bounded by a second uncertainty ellipsoid. The processor may determine that the first uncertainty ellipsoid is bounded by the second uncertainty ellipsoid by determining that the post-fit covariance matrix is less than a target covariance matrix associated with the second uncertainty ellipsoid in a particular direction, and determining that the first uncertainty ellipsoid and the second uncertainty ellipsoid do not intersect. When the first uncertainty ellipsoid is determined to be bounded by the second uncertainty ellipsoid, the processor may select the second uncertainty ellipsoid for altering the drilling parameter.

In yet another aspect, the present disclosure provides a computer-readable medium having a set of instructions stored thereon and accessible to a processor to perform a method of a drilling a borehole, the method including: obtaining errors associated with multi-station survey measurements; partitioning the obtained errors into a set of estimated errors and a set of considered errors; determining a post-fit covariance matrix for the estimated errors that includes the effects of the considered errors on the estimated errors; and altering a drilling parameter of a drill tool in the borehole using the post-fit covariance matrix. The method may further include determining a sensitivity matrix relating a variation in the set of estimated errors to a variation in the set of considered errors, and using the sensitivity matrix to determine the overall covariance matrix. The method may further include determining a distribution of the estimated errors in the survey measurements of the borehole from the post-fit covariance matrix; and altering the drilling parameter using the distribution of the estimated errors. The obtained errors may include at least one selected from the group consisting of: magnetometer bias, accelerometer bias, scale factor, total field measurements and dip. The method may further determine the post-fit covariance matrix when the considered errors are non-observable. In one embodiment, the method may determine a first uncertainty ellipsoid with respect to a position of a drill string from the determined post-fit covariance matrix; and use the first uncertainty ellipsoid to alter the drilling parameter. The method may further include determining whether the first uncertainty ellipsoid is bounded by a second uncertainty ellipsoid. The first uncertainty ellipsoid may be determined to be bounded by the second uncertainty ellipsoid by determining that the post-fit covariance matrix is less than a target covariance matrix associated with the second uncertainty ellipsoid in a particular direction, and determining that the first uncertainty ellipsoid and the second uncertainty ellipsoid do not intersect. The method may include selecting the second uncertainty ellipsoid to alter the drilling parameter when the first uncertainty ellipsoid is bounded by the second uncertainty ellipsoid.

While the foregoing disclosure is directed to the preferred embodiments of the disclosure, various modifications will be apparent to those skilled in the art. It is intended that all variations within the scope and spirit of the appended claims be embraced by the foregoing disclosure.

APPENDIX

In Eq. (5), in order to determine a value of δx that minimizes the measurement residual, one may choose to minimize a performance index given by:

$$J = \frac{1}{2}(\delta y - H\delta\hat{x})^T W (\delta y - H\delta\hat{x}) \qquad \text{Eq. (40)}$$

where W is a symmetric, positive definite weighting matrix. To calculate the minimum mean square error, a substitution $W = R^{-1}$ is made to obtain:

$$J = \frac{1}{2}(y - Hx)^T R^{-1}(y - Hx) \qquad \text{Eq. (41)}$$
$$= \left\|\frac{1}{2}R^{-\frac{1}{2}}(Hx - y)\right\|^2$$

where $R^{-1} = (R^{-1/2})^T R^{-1/2}$ is a Choleksy decomposition of the symmetric, positive definite measurement noise covariance matrix. To find the minimum of the performance index, J, an m×m orthogonal matrix Q, may be introduced. Q is orthogonal so that $QQ^T = Q^T Q = I$. Furthermore, if $Q_1$ and $Q_2$ are orthogonal, then $Q_1 + Q_2$ is also orthogonal. The modified performance index now appears as $$J = \frac{1}{2}(y - Hx)^T \left(R^{-\frac{1}{2}}\right)^T Q^T Q R^{-\frac{1}{2}}(y - Hx) \quad \text{Eq. (42)}$$

$$= \frac{1}{2} \left\| QR^{-\frac{1}{2}}(Hx - y) \right\|^2$$

to find a solution, one chooses the matrix Q to satisfy the equation:

$$QR^{-\frac{1}{2}}H = \begin{bmatrix} U_{n \times n} \\ 0_{(m-n) \times n} \end{bmatrix} \quad \text{Eq. (43)}$$

where U is an upper triangular matrix. Defining $$\begin{bmatrix} b_{n \times 1} \\ e_{(m-n) \times 1} \end{bmatrix} = QR^{-\frac{1}{2}}y, \quad \text{Eq. (44)}$$

the performance index may be rewritten as $$J = \frac{1}{2} \left\| \begin{bmatrix} U \\ 0 \end{bmatrix} x - \begin{bmatrix} b \\ e \end{bmatrix} \right\|^2 \quad \text{Eq. (45)}$$

which is equivalent to $$J = \frac{1}{2} \|Ux - b\|^2 + \frac{1}{2} \|e\|^2 \quad \text{Eq. (46)}$$

It is clear from the above (Eq. (46)) that the value of x that minimizes the performance index is found by the solution of the equation $$U\hat{x} = b \quad \text{Eq. (47)}$$

Since U is upper triangular, Eq. (47) may be solved for $\hat{x}$ via back substitution. The matrix Q may be calculated using various orthogonal transformations.

In order to calculate an a posteriori covariance matrix, a selection matrix Γ is first defined, such that $$\Gamma = [I_{n \times n} 0_{n \times (m-n)}] \quad \text{Eq. (48)}$$

Using Γ, U and b may be rewritten as $$U = \Gamma QR^{-\frac{1}{2}}H \quad \text{Eq. (49)}$$

$$b = \Gamma QR^{-\frac{1}{2}}y$$

$$= \Gamma QR^{-\frac{1}{2}}(Hx + \epsilon)$$

Then the state estimate becomes $$\hat{x} = U^{-1}b \quad \text{Eq. (50)}$$

$$= \left(\Gamma QR^{-\frac{1}{2}}H\right)^{-1} \Gamma QR^{-\frac{1}{2}}(Hx + \epsilon)$$

$$= x + \left(\Gamma QR^{-\frac{1}{2}}H\right)^{-1} \Gamma QR^{-\frac{1}{2}}\epsilon$$

$$= x + U^{-1} \Gamma QR^{-\frac{1}{2}}\epsilon$$

And the a posteriori covariance matrix may be calculated from $$P = E[(\hat{x} - x)(\hat{x} - x)^T] \quad \text{Eq. (51)}$$

$$= E\left[U^{-1}\Gamma QR^{-\frac{1}{2}}\epsilon\epsilon^T \left(R^{-\frac{1}{2}}\right)Q^T\Gamma^T U^{-T}\right]$$

$$= U^{-1}\Gamma QR^{-\frac{1}{2}}R^{\frac{1}{2}}\left(R^{\frac{1}{2}}\right)\left(R^{-\frac{1}{2}}\right)^T Q^T \Gamma^T U^{-T}$$

$$= U^{-1}U^{-T}$$

What is claimed is:

1. A method of a drilling a borehole, comprising:
   obtaining errors associated with multi-station survey measurements obtained at a drill string in the borehole;
   partitioning the obtained errors into a set of magnetometer bias errors and a set of measurement errors including scale factor errors;
   determining a post-fit covariance matrix for the magnetometer bias errors that includes the effects of the measurement errors on the magnetometer bias errors;
   determining an ellipsoid of constant probability for the post-fit covariance matrix, wherein the ellipsoid of constant probability defines an uncertainty in trajectory of the drill string;
   comparing the ellipsoid of constant probability for the post-fit covariance matrix to the ellipsoid of constant probability for a standard error model;
   when the ellipsoid of constant probability for the post-fit covariance matrix is less than the ellipsoid of constant probability for the standard error model, determining an ellipsoid of constant probability for a target error model based on reducing magnetometer bias errors and scale factor errors of the standard error model, the ellipsoid of constant probability for the target error model being bound by the ellipsoid of constant probability for the post-fit covariance matrix;
   correcting a trajectory of the drill string using the target error model; and
   steering the drill string in the borehole using the corrected trajectory.

2. The method of claim 1, further comprising determining a sensitivity matrix relating a variation in the set of magnetometer bias errors to a variation in the set of measurement errors, and using the sensitivity matrix to determine the post-fit covariance matrix.

3. The method of claim 2, further comprising determining a distribution of the magnetometer bias errors in survey measurements of the borehole from the post-fit covariance matrix; and altering the drilling parameter using the distribution of the magnetometer bias errors.

4. The method of claim 1, further comprising determining the post-fit covariance matrix when the measurement errors are non-observable.

5. The method of claim 1, wherein the obtained errors include at least one selected from the group consisting of: magnetometer bias, accelerometer bias, scale factor, total field measurements and dip.

6. The method of claim 1, further comprising determining a first uncertainty ellipsoid with respect to a position of a drill string from the determined post-fit covariance matrix; and using the first uncertainty ellipsoid to alter a drilling parameter.

7. The method of claim 6, further comprising determining whether the first uncertainty ellipsoid is bounded by a second uncertainty ellipsoid.

8. The method of claim 7, wherein determining whether first uncertainty ellipsoid is bounded by the second uncertainty ellipsoid further comprises determining that the post-fit covariance matrix is bounded by a target covariance matrix associated with the second uncertainty ellipsoid, and determining that the first uncertainty ellipsoid and the second uncertainty ellipsoid do not intersect.

9. The method of claim 7, further comprising selecting the second uncertainty ellipsoid to alter the drilling parameter when the first uncertainty ellipsoid is bounded by the second uncertainty ellipsoid.

10. A system for drilling a borehole, comprising:
a drill string configured to drill the borehole; and
a processor configured to:
    obtain errors associated with previous downhole survey measurements,
    partition the obtained errors into a set of magnetometer bias errors and a set of measurement errors including scale factor errors,
    determine a post-fit covariance matrix for the magnetometer bias errors that includes the effects of a variation of the measurement errors on a variation of the magnetometer bias errors;
    determine an ellipsoid of constant probability for the post-fit covariance matrix, wherein the ellipsoid of constant probability defines an uncertainty in trajectory of the drill string;
    compare the ellipsoid of constant probability for the post-fit covariance matrix to the ellipsoid of constant probability for a standard error model;
    when the ellipsoid of constant probability for the post-fit covariance matrix is less than the ellipsoid of constant probability for the standard error model, determine an ellipsoid of constant probability for a target error model based on reducing magnetometer bias errors and scale factor errors of the standard error model, the ellipsoid of constant probability for the target error model being bound by the ellipsoid of constant probability for the post-fit covariance matrix;
    correct a trajectory of the drill string using the target error model; and
    steer the drill string using the corrected trajectory.

11. The system of claim 10, wherein the processor is further configured to determine a sensitivity matrix relating a variation in the set of magnetometer bias errors to a variation in the set of measurement errors, and use the sensitivity matrix to determine the post-fit covariance matrix.

12. The system of claim 10, wherein the processor is further configured to determine a distribution of the magnetometer bias errors in the survey measurements of the borehole from the post-fit covariance matrix; and alter the drilling parameter using the distribution of the magnetometer bias errors.

13. The system of claim 10, wherein the processor is further configured to determine the post-fit covariance matrix when the measurement errors are non-observable.

14. The system of claim 10, wherein the obtained errors include at least one selected from the group consisting of: magnetometer bias, accelerometer bias, scale factor, total field measurements and dip.

15. The system of claim 10, wherein the post-fit covariance matrix provides a distribution of the magnetometer bias errors in the downhole survey measurements.

16. The system of claim 15, wherein the processor is further configured to determine a first uncertainty ellipsoid with respect to a position of a drill string from the determined post-fit covariance matrix; and use the first uncertainty ellipsoid to alter a drilling parameter.

17. The system of claim 16, wherein the processor is further configured to determine whether the first uncertainty ellipsoid is bounded by a second uncertainty ellipsoid.

18. The system of claim 17, wherein the processor is further configured to determine whether the first uncertainty ellipsoid is bounded by the second uncertainty ellipsoid by determining that the post-fit covariance matrix is bounded by a target covariance matrix associated with the second uncertainty ellipsoid, and determining that the first uncertainty ellipsoid and the second uncertainty ellipsoid do not intersect.

19. The method of claim 17, wherein the processor is further configured to select the second uncertainty ellipsoid to alter the drilling parameter when the first uncertainty ellipsoid is bounded by the second uncertainty ellipsoid.

20. A non-transitory computer-readable medium having a set of instructions stored thereon and accessible to a processor to perform a method of a drilling a borehole, the method comprising:
    obtaining errors associated with multi-station survey measurements;
    partitioning the obtained errors into a set of magnetometer bias errors and a set of measurement errors including scale factor errors;
    determining a post-fit covariance matrix for the magnetometer bias errors that includes the effects of a variation of the measurement errors on a variation of the magnetometer bias errors;
    determining an ellipsoid of constant probability for the post-fit covariance matrix, wherein the ellipsoid of constant probability defines an uncertainty in trajectory of the drill string;
    comparing the ellipsoid of constant probability for the post-fit covariance matrix to the ellipsoid of constant probability for a standard error model;
    when the ellipsoid of constant probability for the post-fit covariance matrix is less than the ellipsoid of constant probability for the standard error model, determining an ellipsoid of constant probability for a target error model based on reducing magnetometer bias errors and scale factor errors of the standard error model, the ellipsoid of constant probability for the target error model being bound by the ellipsoid of constant probability for the post-fit covariance matrix;
    correcting a trajectory of the drill string using the target error model; and
    steering the drill string in the borehole based on the corrected trajectory.

21. The non-transitory computer-readable medium of claim 20, wherein the method further comprises determining a sensitivity matrix relating a variation in the set of magnetometer bias errors to a variation in the set of measurement errors, and using the sensitivity matrix to determine the overall covariance matrix.

22. The non-transitory computer-readable medium of claim 20, wherein the method further comprises determining a distribution of the magnetometer bias errors in the survey measurements of the borehole from the post-fit covariance matrix; and altering the drilling parameter using the distribution of the magnetometer bias errors.

23. The non-transitory computer-readable medium of claim 20, wherein the obtained errors include at least one selected from the group consisting of: magnetometer bias, accelerometer bias, scale factor, total field measurements and dip.

24. The non-transitory computer-readable medium of claim 20, wherein the method further comprises determining the post-fit covariance matrix when the measurement errors are non-observable.

25. The non-transitory computer-readable medium of claim 20, wherein the method further comprises determining a first uncertainty ellipsoid with respect to a position of a drill string from the determined post-fit covariance matrix; and using the first uncertainty ellipsoid to alter a drilling parameter.

26. The non-transitory computer-readable medium of claim 25, wherein the method further comprises determining whether the first uncertainty ellipsoid is bounded by a second uncertainty ellipsoid.

27. The non-transitory computer-readable medium of claim 26, wherein determining whether first uncertainty ellipsoid is bounded by the second uncertainty ellipsoid further comprises determining that the post-fit covariance matrix is bounded by a target covariance matrix associated with the second uncertainty ellipsoid, and determining that the first uncertainty ellipsoid and the second uncertainty ellipsoid do not intersect.

28. The non-transitory computer-readable medium of claim 26, wherein the method further comprises selecting the second uncertainty ellipsoid to alter the drilling parameter when the first uncertainty ellipsoid is bounded by the second uncertainty ellipsoid.

* * * * *